June 5, 1956   D. R. G. BAILEY   2,748,879
FULLY OSCILLATING VEHICULAR SUSPENSION AND/OR DRIVE
Filed Sept. 8, 1953   2 Sheets-Sheet 1

INVENTOR:
DAVID ROBERT GORDON BAILEY,
BY
AGENT.

June 5, 1956 D. R. G. BAILEY 2,748,879
FULLY OSCILLATING VEHICULAR SUSPENSION AND/OR DRIVE
Filed Sept. 8, 1953 2 Sheets-Sheet 2
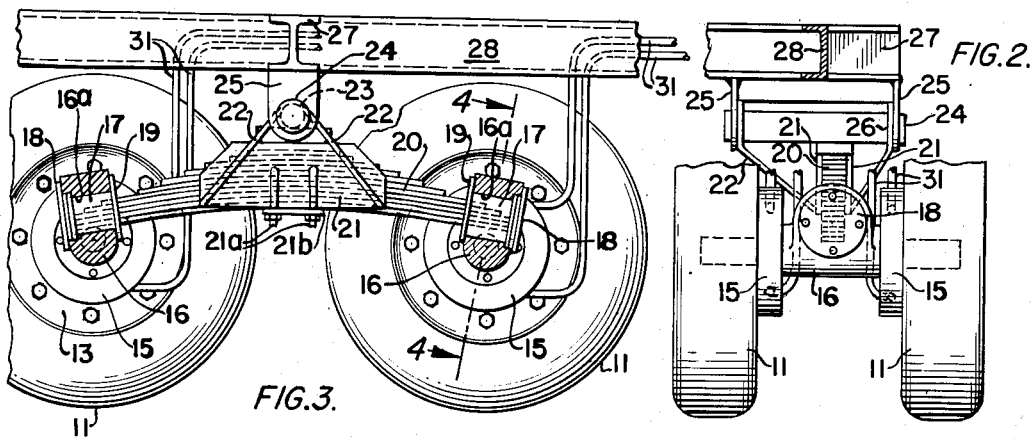
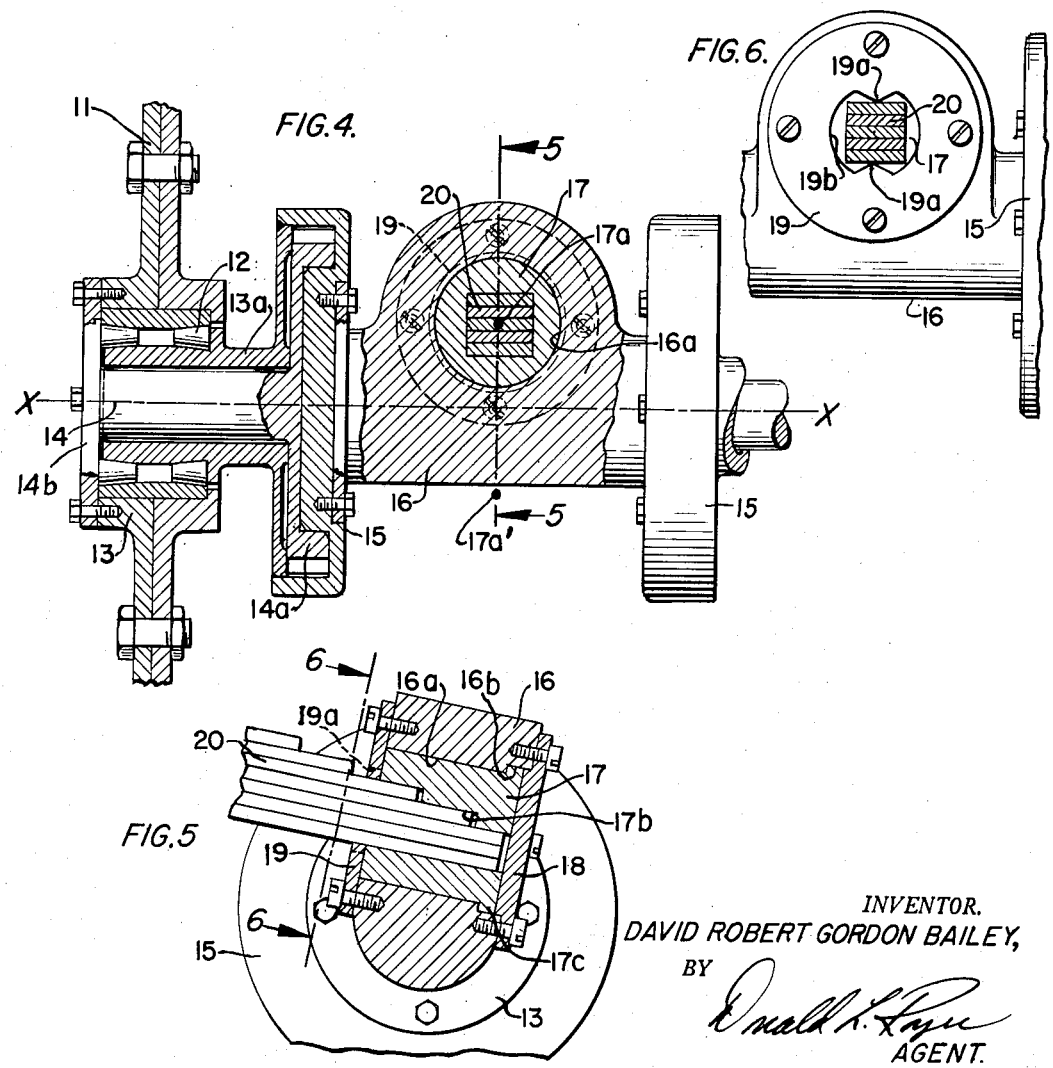
INVENTOR.
DAVID ROBERT GORDON BAILEY,
BY
AGENT.

United States Patent Office 2,748,879
Patented June 5, 1956

2,748,879

FULLY OSCILLATING VEHICULAR SUSPENSION AND/OR DRIVE

David Robert Gordon Bailey, Bellingen, New South Wales, Australia, assignor to Fenton Max MacMillan, Arcadia, Calif.

Application September 8, 1953, Serial No. 378,914

5 Claims. (Cl. 180—24)

This invention is an improved type of vehicle suspension which can be applied to all types of road vehicles but is particularly adaptable to heavy duty transport. My improved type of suspension resides in the attachment of improved types of castings and axles to the springs and allows each wheel to carry at all times its correct proportion of the load regardless of the camber or uneven surface of the roadway and resides also in the application of a separate hydraulic motor, of known and proven type driven by a pump or pumps situated behind the power unit, individually to each ground wheel thus dispensing with the conventional drive and allowing power to be transmitted equally to each wheel at all times without the use of drive shafts, chains or similar known means. This suspension lends itself to advantage in the application of hydraulic drive as only a moderate amount of power is required at each wheel yet making an adequate total for all traction purposes.

The type of road vehicle is a multi-wheeled self propelled vehicle having each wheel mounted on an independent stub axle and provided with vehicle springs each having its outer ends housing respectively in one of said axles.

In the accompanying drawings which illustrate one form of the invention:

Fig. 2 is a rear view of a portion of the present support as taken substantially as indicated by line 2—2, Fig. 1;

Fig. 3 is a side view partially in section of the wheel supporting mechanism as taken substantially as indicated by line 3—3, Fig. 1;

Fig. 4 is an enlarged sectional view through the wheel support and driving mechanism of the present invention as taken substantially as indicated by line 4—4, Fig. 3;

Fig. 5 is a sectional view through the spring support arrangement of the present invention as taken substantially as indicated by line 5—5, Fig. 4; and Fig. 6 is a fragmentary sectional view of one portion of the spring support showing the limit stops as taken substantially as indicated by line 6—6, Fig. 5.

Figure 1:
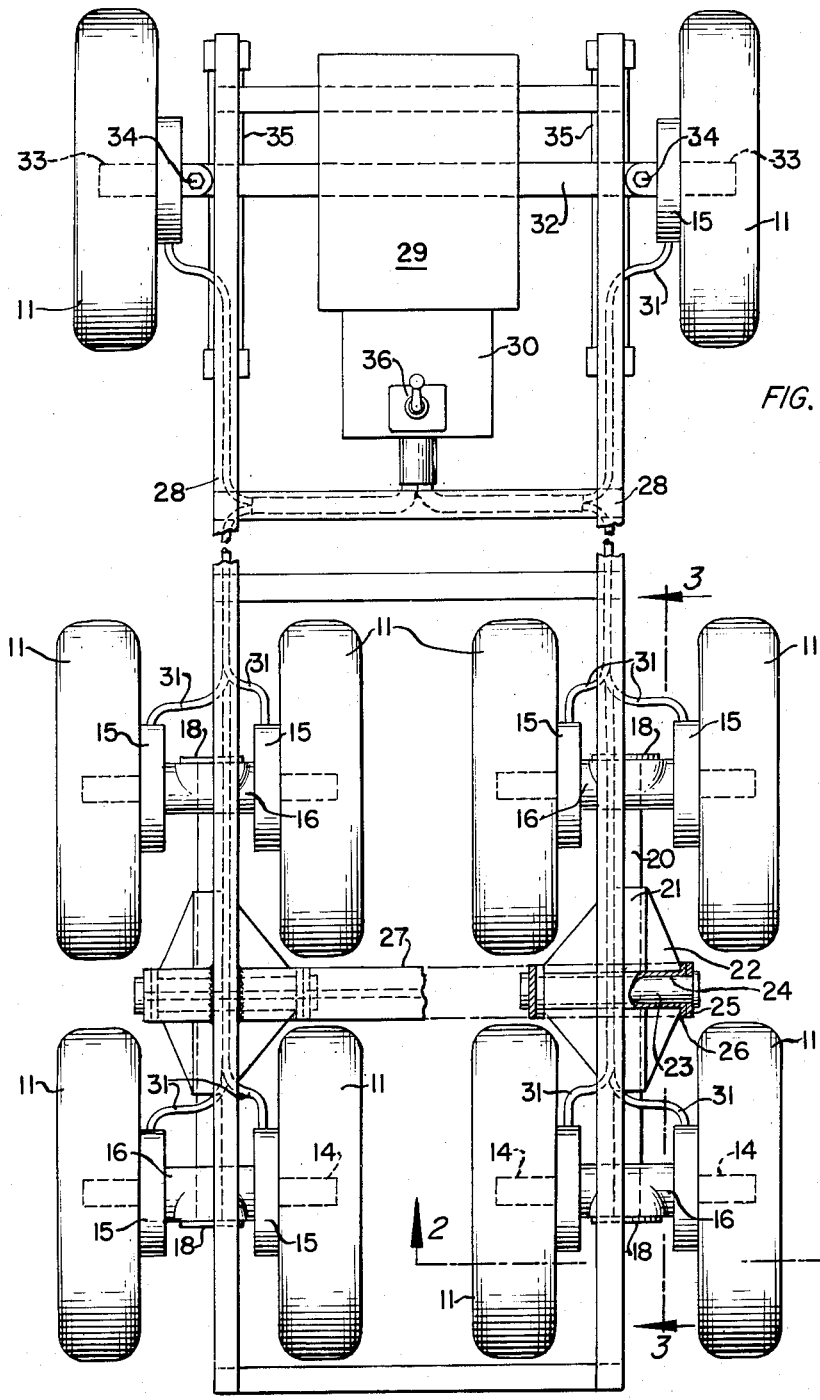
Fig. 1 is a top plan view showing the device of the present invention in use with a vehicle.

This invention relates to the improved supporting of road vehicles and the employment of an hydraulic motor separately and independently to each wheel as a driving medium. In Figs. 1 to 4 conventional road wheels 11 are shown as singles but the same suspension can be designed to take dual wheels if and where necessary. There are ten of these wheels 11 shown on the particular vehicle in the drawings.

The wheels 11 are mounted on tapered bearings 12 which are housed on their outer diameter in the wheel hub 13. The internal diameter of the bearings being carried on a tube 13a projecting from the housing of the hydraulic motors 15. Bearings 12 and wheel hub 13 are not shown in Figs. 1, 2, and 3 as too much detail would make these figures difficult to interpret, but they are shown on Fig. 4 which illustrates their location and configuration. Each wheel 11 has power transmitted to it by means of an axle 14 attached to the driven member 14a of the motor 15 and secured to the wheel hub 13 by means of a flange 14b on its outer end. This axle 14 is not shown in Figs. 1, 2, and 3 but is shown in Fig. 4.

An axle pivot housing 16 is a steel casting which rotatably houses the spring-end casting 17 in a bore 16a and also forms the outer portion of a pivot point 17a at which the wheels 11 and the motor assemblies are arranged to move or oscillate at right angles to the longitudinal axis of the chassis 28 and in conformity with the configuration of the ground over which the vehicle is passing. The axle pivot housing 16 is so constructed that in these drawings it is shown with the centre of the spring-end casting above the axle centres X—X giving in effect an overslung type of suspension. It is to be noted that by turning the axle pivot housing 16 diametrically through 180 degrees the spring and axis 17a' of the casting 17 can be brought below the centres of the axles 14 and thus give an under slung type of suspension; this change is made by method of assembly only, no alteration being necessary to any of the parts involved.

The spring-end casting 17 is so designed as to make a journal on which axle pivot housing 16 is allowed to oscillate within certain limits also to take within its internal stepped opening 17b the five lower leaves of the spring 20. This part also has on its outer surface a ring or annular flange 17c which fits into a corresponding recess 16b in the bore 16a of the axle pivot housing 16 thus locating these parts in their respective positions.

The leaf spring 20 is of conventional form and the amount of set or arc of its leaves has a beneficial effect on the tracking of the vehicle in that flexation thereof in a direction tending further to bend the leaves causes a slight acceleration when a road wheel 11 goes into a depression in the roadway, and momentary deceleration by flexation of the leaves in an opposite direction when the road wheel is coming out of a depression or mounting an obstacle in the roadway; these increments and decrements in wheel speed are naturally very small but are of the greatest importance in that the effect is to eliminate tire scrubbing which is so prevalent in the conventional type bogie or tandem constructions.

A cover plate 18 is used on the outer ends of the axle pivot housings 16 to prevent the entry of dirt and to retain lubricant.

An oscillation-limit plate 19 is used on the inner ends of the axle pivot housings 16, its function being to limit the amount of oscillation of the axle pivot housing 16 and thus determine the amount of rise and fall that can take place at any of the road wheels 11. This is accomplished by means of two lugs 19a on the internal opening 19b of this limit plate as shown in Fig. 6. These lugs come in contact with the first five leaves of spring 20 where they pass into the spring-end casting 17.

A box 21 is so formed as to enclose the spring for about one half of its length thus ensuring perfect alignment of springs 20 and the chassis 28 at all times. The springs 20 are held in the box 21 by hanger bolts 21a and a cross plate 21b. Gussets 22 extend from the ends of spring pivot tube 23 as reinforcements to the lower extremities of the box 21 maintaining its alignment with spring pivot tube 23 and adding strength to the assembly, but in many cases these gussets may not be required.

Spring pivot tube 23 has at each end a plate 26 attached thereto in such a manner as to bear against hanger members 25 and absorb thrust and reduce wear at these points.

A spring pivot pin 24 passes through hanger plates 25 and through the spring pivot tube 23 that is above and normally parallel to the axle pivot housing 16 thus forming a transverse hinge or pivot on which spring 20 and its end assemblies can oscillate within pre-determined limits.

The hanger plates 25 are attached to a rear wheel assembly cross member 27 (Figs. 2 and 3). This cross member extends beyond the chassis 28 far enough to support the outer ends of the spring pivot tubes 23.

An engine 29 of any conventional type is used to drive an hydraulic pump or pumps 30 which is or are connected with the hydraulic motors 15 by means of independent hydraulic pipe lines 31 which convey the fluid to and from these hydraulic units.

Front axle 32, stub axle 33, stub axle pivot 34 and front springs 35 are conventional parts as at present used in vehicles and are illustrated in order to indicate their positions in relation to the rest of the vehicle.

The various valves and controls of the hydraulic circuits, as may be placed in a control box 36, are not illustrated as these are common knowledge and their application is conventional.

Fluid delivered from the pump 30, under control of the conventional valves in the control box 36, is delivered by way of the hydraulic pipe lines 31 in the manner hereinbefore described in order that motive power may be applied to each of the wheels of the vehicle.

Having thus described the invention and the present preferred embodiments thereof, it is desired to emphasize the fact that modification may be resorted to in a manner limited only by a just interpretation of the following claims.

I claim:

1. In a multi-wheeled self propelled road vehicle having a frame, a wheel mounting arrangement comprising: a pair of leaf springs each having a plurality of leaves therein; means pivotally supporting a longitudinal central portion of said springs on a transverse axis relative to said frame; end castings mounted on the forward and rearward ends of said springs; internal stepped openings in said casting receiving a portion of the leaves of said springs; a plurality of housings each having outer ends; a bore in each of said housings; said castings being received in said bores and said housings being pivotally mounted thereon; means for retaining said housings on said castings; axle shafts carried by said housings and extending laterally therefrom, said wheels being mounted on said shafts; oscillation-limit plates mounted on said housings and surrounding said spring leaves adjacent the forward and rearward ends thereof; and a pair of lugs carried by each of said plates, said lugs being engageable with said leaves of said springs for limiting oscillation of said housings and said wheels about said castings and said springs.

2. A wheel mounting arrangement according to claim 1 wherein each of said housings is provided with a dirt excluding and lubricant retaining cover plate in engagement with the casting associated therewith.

3. A wheel mounting arrangement according to claim 1 wherein said retaining means for said housings, with respect to said castings, comprises an annular flange on said castings and a cooperating annular recess in said housings.

4. A wheel mounting arrangement according to claim 1 wherein hydraulic motors are connected to each of said axle shafts for driving said shafts and said wheels, said motors being interposed between said axle shafts and said housing and carried by said outer ends of said housings.

5. A wheel mounting arrangement according to claim 1 wherein said portion of said leaves of said spring comprises the lowermost five leaves of said plurality thereof.

References Cited in the file of this patent

UNITED STATES PATENTS

| | | |
|---|---|---|
| 2,082,001 | Hanson | June 1, 1937 |
| 2,121,862 | Dodge | June 28, 1938 |
| 2,228,411 | Sheridan | Jan. 14, 1941 |
| 2,343,872 | Low | Mar. 14, 1944 |
| 2,390,912 | Ayers | Dec. 11, 1945 |
| 2,418,123 | Joy | Apr. 1, 1947 |